United States Patent [19]

Aldrich

[11] 4,210,066
[45] Jul. 1, 1980

[54] POWER DRIVE UNIT

[75] Inventor: Allyn M. Aldrich, Rockford, Ill.

[73] Assignee: Sundstrand Corporation, Rockford, Ill.

[21] Appl. No.: 900,312

[22] Filed: Apr. 26, 1978

[51] Int. Cl.² .......................... F01B 13/04; F04B 1/30
[52] U.S. Cl. ......................................... 91/506; 60/230
[58] Field of Search .......................... 60/230; 417/222; 91/506, 380, 382, 384

[56]  References Cited
U.S. PATENT DOCUMENTS

| | | | |
|---|---|---|---|
| 2,428,025 | 9/1947 | Ingoldby | 91/381 |
| 2,863,422 | 12/1958 | Mercior et al. | 91/384 |
| 3,164,960 | 1/1965 | Weisenbach et al. | 417/222 |
| 3,184,427 | 5/1965 | Magnuson | 91/497 |
| 3,495,536 | 2/1970 | Fahey | 91/378 |
| 3,931,944 | 1/1976 | Capewell | 60/230 |

FOREIGN PATENT DOCUMENTS 2312911  10/1973  Fed. Rep. of Germany ........... 417/222

Primary Examiner—William L. Freeh
Attorney, Agent, or Firm—Wegner, Stellman, McCord, Wiles & Wood

[57]  ABSTRACT

A power drive unit for operation of structure in opposite directions, such as aircraft structure and, particularly, thrust reverser structure of an aircraft engine operable between stow and deploy positions, including, a bi-directional hydraulic motor having a variably positionable wobbler for controlling displacement of the motor. Control structure includes a valve for causing fluid flow through the motor in either of two directions, a control cylinder and piston connected to the wobbler for setting the motor at either minimum or maximum displacement conditions. In one embodiment, there is an intermediate displacement position. The displacement condition is established by valve structure responsive to the particular cycle of operation.

15 Claims, 2 Drawing Figures

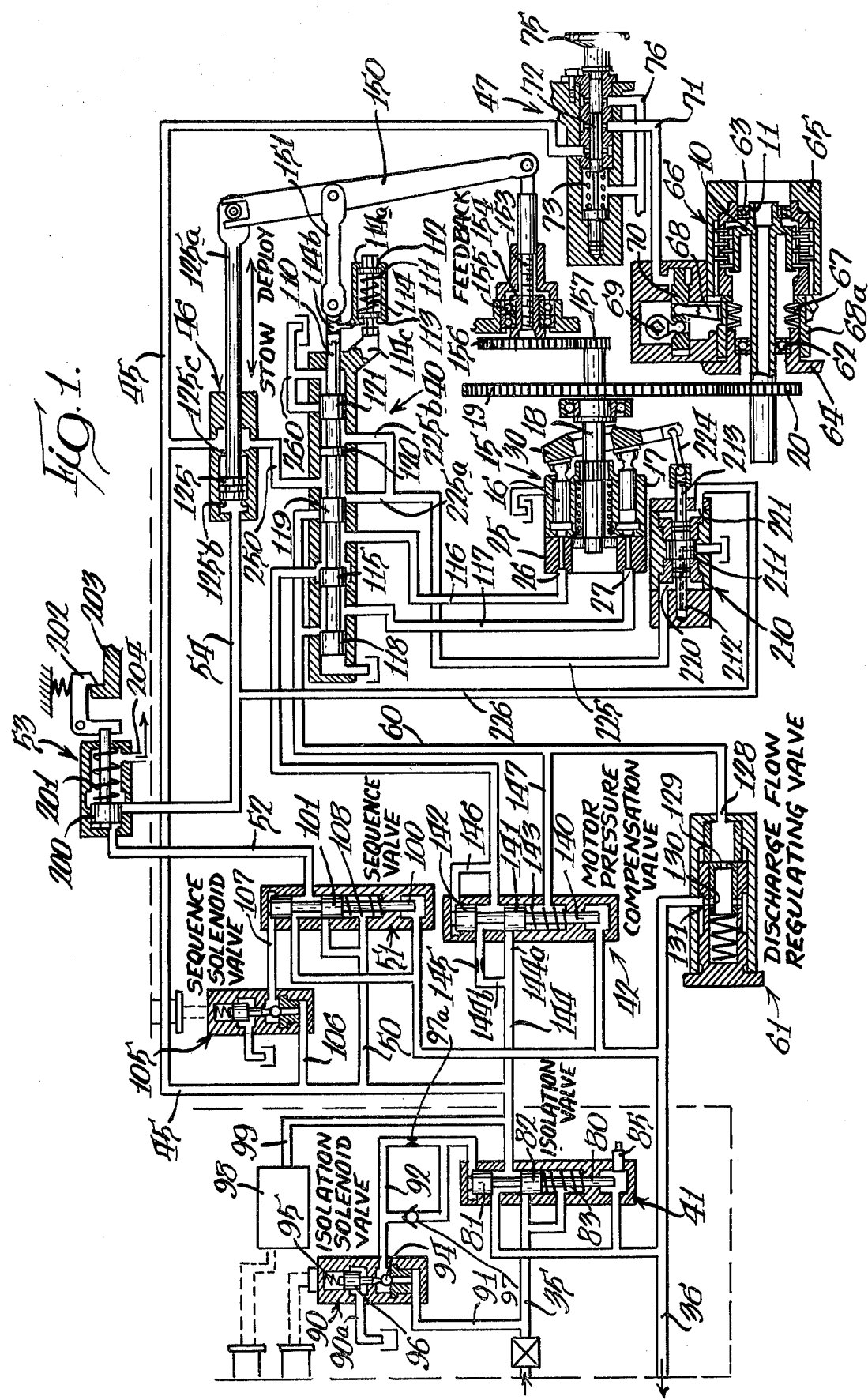

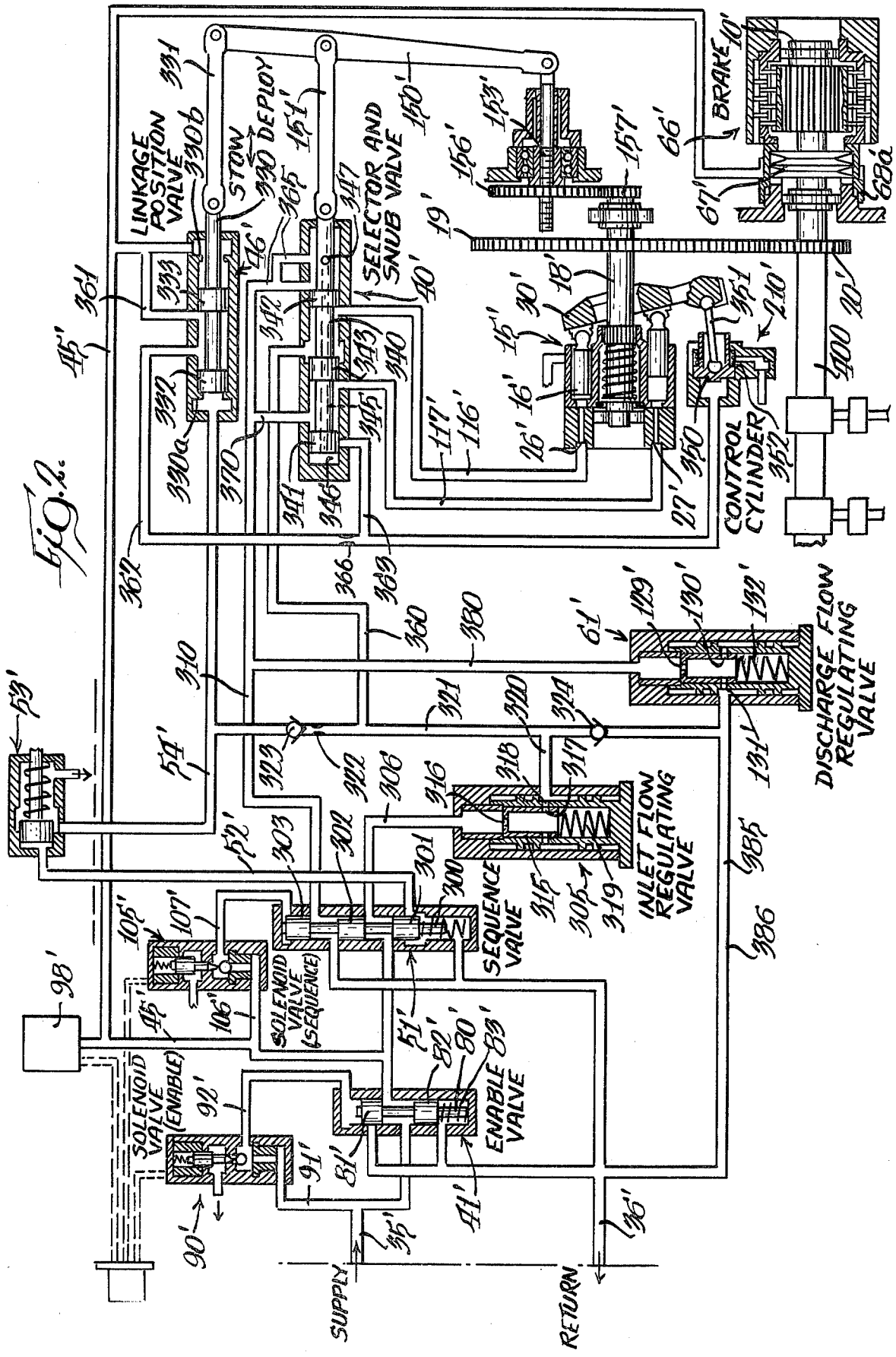

POWER DRIVE UNIT

BACKGROUND OF THE INVENTION

This invention pertains to a power drive unit utilizing a hydraulic power supply for operation of a structure by a fluid-operated hydraulic motor and which places different loads on the motor during a cycle of operation and having means setting the motor displacement dependent upon selected cycle of operation.

Power drive units having a hydraulic fluid supply have many different uses with one particular use being in the aircraft field where the unit is utilized for powering aircraft engine structure, such as thrust reversers which must be moved between stow and deploy positions. Power driven units have included air motors for operation of such structure and the prior art also includes the use of a hydraulic bi-directional motor, with the motor having a fixed displacement.

In operation of certain structure, such as thrust reversers, there are varying torque demands on the motor during the cycle of operation and in using a fixed displacement motor, the motor must be set to an adequate displacement to provide the necessary maximum torque requirement and with the fixed displacement and constant hydraulic fluid supply it is not possible to provide for increased speed of the motor when there are lesser torque demands on the motor.

SUMMARY OF THE INVENTION

A primary feature of the invention disclosed herein is to provide a power drive unit for imparting drive to a mechanism with different torque demands at different times in the cycle of operation and which establishes different displacements at different times to provide the necessary torque for the mechanism, with the result that the mechanism can operate at the maximum possible speed in a cycle having a lesser load condition. Advantageously, this enables the present unit to more nearly optimize the utilization of power available in a given hydraulic supply over prior art fixed displacement units.

An object of the invention is to provide a power drive unit for imparting two-directional drive to a mechanism with different torque demands at different times in the cycle of operation comprising, a bi-directional motor with displacement-varying means, a control cylinder having a piston connected to the displacement-varying means, a first circuit connected to the motor and including a valve for controlling the direction of flow to the motor, and a second circuit connected to the control cylinder responsive to the load requirement for the cycle of operation for controlling the position of the piston in the cylinder to control the position of the displacement-varying means.

Another object of the invention is to provide a power drive unit for imparting two-directional drive to a mechanism with different torque demands at different times in the cycles of operation comprising, a bi-directional motor with a displacement-varying wobbler, a control cylinder having a piston connected to said wobbler, a first circuit connected to said motor and including a valve for controlling the direction and volume of flow to the motor, a second circuit connected to said control cylinder and including valve means for controlling the position of the piston in the cylinder to control the position of said wobbler.

An additional object of the invention is to provide a power drive unit as defined in the preceding paragraph wherein said wobbler has two positions to establish either a maximum or minimum displacement.

An additional object of the invention is to provide a power drive unit as defined in the preceding paragraph wherein said wobbler has a third intermediate displacement position.

BRIEF DESCRIPTION OF THE DRAWINGS

FIG. 1 is a schematic of the power drive unit with certain components shown in central vertical section; and FIG. 2 is a schematic of an alternative embodiment of the power drive unit.

DESCRIPTION OF THE PREFERRED EMBODIMENTS

The power drive unit is provided for operation of mechanism (not shown) having a drive train which connects into a tubular rotatable shaft 10, as by fitting a flexible shaft into an interior opening 11 thereof. The rotatable shaft 10 is rotated in either of two directions by a variable displacement hydraulic motor, indicated generally at 15, and which, in the form shown, is an axial piston motor. As well known in the art, an axial piston motor has a series of pistons 16 carried within a series of longitudinal bores in a cylinder block 17 which connects to an output shaft 18. The shaft 18 has a gear 19 meshing with a gear 20 on the rotatable shaft 10. A valve block 25, forming part of the motor, has a pair of ports 26 and 27 for directing pressure fluid through the motor. The displacement of the motor may be varied by varying the stroke of the pistons 16. This is accomplished by positioning of a wobbler 30, which may be set at various angles. As shown in FIG. 1, it is shown in an intermediate displacement establishing position. The minimum displacement position is clockwise thereof and the maximum displacement position is counterclockwise thereof, with these positions being established by structure subsequently described.

The fluid circuit associated with the motor includes a supply line 35 and a return line 36, with the supply line and return line both extending to a selector and snub valve, indicated generally at 40. The supply line 35 has an isolation valve 41 connected therein for opening and closing said line. Additionally, a motor pressure compensator valve 42 is in said supply line, for a purpose to be described.

A first supply branch line 45 extends to a linkage actuator cylinder 46 and to a manual brake disable valve 47. A second supply branch line 50 connects to a sequence valve 51, with the output of the sequence valve being connected by a line 52 to a latch release actuator 53 and with flow therethrough to a line 54, which connects to the linkage actuator cylinder 46.

The return line 36 has a section 60 extending from the selector and snub valve 40 and connected to a discharge flow regulating valve 61.

The rotatable shaft 10 is mounted by bearings 62 and 63 to stationary housing parts 64 and 65 and with a brake 66 having interleaved brake plates keyed alternately to the shaft and the interior of the housing section 65. The brake is normally active under the urging of Belleville springs 67 compressing the brake plates to hold the shaft 10 against rotation. The brake can be released by counterclockwise pivoting of a release lever 68 to relieve the spring pressure. The pivoting of the lever 68 shifts a sleeve 68a. A mechanically rotatable member 69 is connected to the release lever 68 by a hydraulic ram 70 for manual release of the brake to permit rotation of the rotatable shaft 10.

The manual brake disable valve 47 controls the supply of pressure fluid from the branch supply line 45 to the hydraulic ram 70 through a line 71 connected between the valve 47 and the hydraulic ram 70. The valve 47 has a valve stem 72 urged to the right, as shown in FIG. 1, by a spring 73 to position the valve lands to permit pressure fluid flow to the hydraulic ram 70 for shift thereof to the left to release the brake when there is pressure in branch supply line 45. The valve 47 can be shifted to a position to block fluid supply line 45 by rotation of a hand wheel 75. This shifts the valve stem 72 to the left against the action of the spring 73 and connects line 71 to a return line connection 76.

The isolation valve 41 has a valve spool 80 with a pair of lands 81 and 82. A spring 83 and supply pressure within the valve housing urges the spool upwardly to have the land 82 close off the supply line 35. If it is desired to prevent lowering movement of the valve spool, a pin 85 may be moved manually inwardly to obstruct downward movement of the valve spool.

The entire power drive unit is inactive when the spool 80 is in its upper position. In order to activate the system, a solenoid pilot valve 90 is opened to direct pressure fluid through lines 91 and 92 to the upper end of the valve spool 80 and shift it downwardly against the action of the spring 83 and supply pressure which lowers the land 82 and opens the supply line. The pilot valve 90 has a ball valve member 94 normally urged to closed position against a seat by a spring 95 acting on an armature 96 and a solenoid coil which, upon energization, raises the armature to permit flow through the pilot valve. A time delay circuit having a check valve 97 and an orifice 97a limit the rate of fluid flow to valve return line 90a on deactivation of the pilot valve and return of the isolation valve to its upper position.

The existence of pressure in the system downstream of the isolation valve 41 is established by a pressure detection switch 98 connected to the supply line by a line 99 and which can electrically signal the pressure condition.

The power drive unit has two distinct modes of operation and it is necessary, for activation of the isolation valve 41, for both modes. The sequence valve 51 is only activated in one of the modes and, specifically, the deploy mode when the power drive unit is utilized for stow and deploy operation of the thrust reverser structure. The sequence valve 51 has a valve spool 100 and, with a land 101 normally operating to block the second branch supply line 50. Upon energization of a solenoid pilot valve 105, pressure fluid can flow through lines 106 and 107 from the first branch supply line 45 to the upper end of the valve spool 100 and shift the spool downwardly against the action of a spring 108 and supply pressure whereby pressure fluid can flow to line 52 which extends to the latch release cylinder 53. The solenoid pilot valve 105 is of the same construction as the solenoid pilot valve 90.

The selector and snub valve 40 has a valve member 110 operable in a casing and which is normally urged to the stow position shown in FIG. 1 by a spring 111 acting between ring members 112 and 113 which are movable on a stem 114 fastened to a valve casing arm 114c and have limit positions under the urging of the spring 111 determined by engagement with shoulders on a casing 114a connected to the valve member by an arm 114b. In this bias position, the valve permits limited flow to the motor. A valve land 115 controls the delivery of pressure fluid from the supply line 35 to one or the other of lines 116 and 117 extending to the motor valve ports 26 and 27. The valve has additional lands 118,119, for control of communication of one of the lines 116 or 117 to the return line section 60 for fluid discharged from the motor. A pair of lands 120 and 121 are for a purpose to be described.

The linkage actuator 46 has a differential area piston 125 movable within a cylinder and with a piston rod 125a extending outwardly thereof. The larger area of the piston communicates with the line 54 extended from the latch release cylinder while the smaller rod end area communicates with the first branch supply line 45. The movement of the piston is limited by shoulders 125b and 125c.

The discharge flow regulating valve 61 controls the speed of the motor 15 and is of a conventional structure, with fluid entering from line 60 at 128 and flowing through an orifice 129 in a cup-shaped valve member. The valve member has ports 130 communicating with fixed casing ports 131 which communicate with the return line 36. The orifice 129 creates a pressure drop thereacross and when a certain flow rate is exceeded, the differential pressure is sufficient to shift the valve member to the left and compress the spring 132 whereby the ports 130 and 131 restrict outlet flow. As a result, the maximum flow rate through the return line is controlled.

The motor pressure compensator valve 42 has a valve spool 140 with lands 141 and 142 and is urged upwardly by a spring 143. Upon energization of the system, fluid flows to a line 144 having branches 144a and 144b, with the latter having a fixed orifice 145. Flow can only continue through branch 144b since land 141 blocks branch 144a. This flow passes to pilot line 146 and shifts the valve spool 140 downwardly to lower land 141 and permit full flow through the valve. A pilot passage 147 branches from return line section 60 for a purpose to be described.

The piston rod 125a of the linkage actuator is connected to one end of a control link 150. This control link intermediate its ends is connected to the valve member 110 of the selector and snub valve 40 through an intermediate link 151 to establish the operating condition of the valve. The opposite end of the control link 150 is pivotally connected to a threaded shaft 153 which threadably engages within a nut 154. The nut 154 is mounted within a part of the housing by bearings 155 and rotates a gear 156 which meshes with a gear 157 on the motor output shaft 18. This structure provides a feedback mechanism to control snub timing whereby motor rotation and resulting operation of the mechanism powered thereby is monitored to provide a variation in speed of motor operation near the end of a cycle. This is accomplished by the feedback mechanism shifting the valve member 110 of the selector and snub valve 40 to a position near the end of the cycle where the valve land 115 limits fluid flow to the motor.

The power drive unit is shown de-energized and with a part of a thrust reverser structure stowed. When the thrust reverser structure is to be deployed, the solenoid pilot valve 90 is operated to shift the valve spool of the isolation valve 41 and cause delivery of hydraulic pressure fluid through the supply line 35 to the motor pressure compensator valve 42 for downward shift thereof and to the selector and snub valve 40. Fluid flows through the first branch supply line 45 to release the brake 66 and permit rotation of the rotatable shaft 10. Additionally, the solenoid pilot valve 105 is energized to cause shift of the sequence valve 51 whereby pressure fluid flows through the second branch supply line 50 to the latch release cylinder 53. This urges a piston 200 to the right against the action of a spring 201 to pivot a latch 202 counterclockwise and release a part 203 of the thrust reverser structure. This latch release cylinder serves as an interlock whereby after the piston 200 has moved to the right, communication is established between the line 52 and the line 54. This results in pressure against the large pressure area of the actuator piston 125 which shifts the piston rod 125a to the right, and through the control link 150, moves the selector and snub valve spool 110 to the right. This results in pressure fluid being applied to the line 117 to cause rotation of the motor in one direction and with fluid from the motor flowing through line 116 and to the return line section 60. As the motor operates, the feedback mechanism causes movement of the valve spool 110 to the left because of the piston rod 125a being fixed in position and the central land 115, near the end of the deploy operation, gradually reduces flow to the line 117 to progressively stop the motor.

In a stow operation, the sequence valve 51 is not activated, with the result that pressure in the first branch supply line 45 applied to the smaller area of the piston 125 of the linkage actuator 46 results in shifting the piston rod 125a to the left. This is permitted by backward flow through line 54 to the latch release cylinder 53 and return to tank through a return connection 204. This movement of the piston rod to the left shifts the valve member 110 to the left to cause pressure fluid to flow through line 116 to the motor for rotation in the opposite direction. The fluid outflow from the motor through line 117 flows to the return branch line 60. Again, the feedback mechanism operates near the end of the stow cycle to reposition the valve member 110 to reduce flow near the end of the stow cycle.

With the structure shown, there is pressure acting continuously through branch supply line 45 on the actuator piston 125 to bias the unit in a stow direction for return of the operated structure to a stow position in the event of a deploy signal failure.

The motor pressure compensator valve 42 functions to protect the motor by limiting motor pressure when the thrust reverser structure is acting as an aiding load rather than a resisting load. The valve senses high outlet pressure through line 147 and shifts the valve spool 140 upwardly to have the land 141 block the branch 144a and cause supply flow through orifice 145 which drops motor inlet pressure to an acceptable level.

In operation of certain structures, such as thrust reverser structure, there are varying load conditions exerted on the motor 15. There can be relatively high break-out torque requirements on initial movement of the structure, as well as varying torque requirements during the cycle of operation. In addition to resisting loads, there can be times in the cycle of operation in which the structure imparts an aiding load on the motor.

The power drive unit shown in FIG. 1 provides for three different positions of the wobbler 30 to vary the displacement of the pistons 16 to provide the required motor torque. It is possible to optimize the speed of the motor 15 when the wobbler is set to only provide the necessary amount of motor torque.

The positioning of the wobbler is controlled by a control cylinder 210 having a piston 211 with balanced opposed areas provided by stems 212 and 213, with the latter stem being swivelly connected by a link 214 to the wobbler 30. The cylinder has a pair of ports 220 and 221 for selectively applying pressure to the opposed piston areas. The port 220 is connected by a line 225 having a pair of branch lines 225a and 225b to the selector and snub valve 40. The port 221 is connected by a line 226 to the line 54 to be subject to pressure through the latch release cylinder 53.

In a stow operation, the pilot valve 90 is energized to supply pressure fluid to the selector and snub valve 40 and to shift the piston rod 125a of the linkage actuator 46 to the left as shown in FIG. 1.

The operation of pilot valve 90 also causes release of the brake 66 by pressure fluid flowing through the manual brake disable valve 47 and line 71 to shift the ram 70. Pressure fluid delivered to the linkage actuator 46 is also supplied to a line 250 extended therefrom to the selector and snub valve 40. The valve spool 110 of the latter valve, having been shifted to the left by the action of the linkage actuator, has shifted land 119 to a position to connect line 250 to the line 225 leading to the control cylinder 210. This results in shifting the piston 211 of the control cylinder to the right to position the wobbler 30 in a maximum displacement position, since there is no pressure in line 226 extending to the control cylinder port 221. In the stow operation, the line 226 connects to return line 204 through the latch release cylinder 53. This maximum displacement is maintained through the entire stow cycle, with the speed of the motor being reduced near the end of the cycle by the feedback mechanism acting on the valve member 110 to bring the valve land 119 to the right to substantially close off and then close the line 116 which delivers pressure fluid to the motor.

In a deploy operation, the pilot solenoid valve 90 is energized and also the pilot solenoid valve 105. The actuation of the first of these valves again results in delivery of pressure fluid to the selector and snub valve 40 and to the structure for releasing brake 66, as well as pressure to the wobbler control cylinder 210. The actuation of the sequence valve 51 by actuation of its pilot valve results in pressure fluid being delivered to the latch release cylinder 53 for release of the thrust reverser element 203. After this has been accomplished, the shifting of the piston 200 of the latter cylinder places pressure fluid in the line 54 which functions to extend the piston rod 125a of the linkage actuator 46 to the right and also delivers pressure fluid to the control port 221 of the control cylinder 210 through the line 226. The actuation of the piston rod 125a to the right, as shown in FIG. 1, has shifted the valve spool 110 to the right, from a central position, whereby pressure fluid is delivered to line 117 extending to the motor and fluid is returned through line 116 to the return line section 60. Pressure fluid also goes to the control cylinder control port 220 through line 225 and branch 225b. This results in the piston 211 of the control cylinder having equal pressure acting on both sides thereof wherein the piston is in a central position to resultingly place the wobbler 30 in an intermediate displacement position, as shown in full line in FIG. 1. This provides an intermediate torque and speed operation for the motor 15. During the deploy cycle, the feedback mechanism, driven by the motor shaft 18, causes movement of the valve spool 110 toward the left to a position wherein the branch 225a of the line 225 is blocked from pressure line 250 by valve land 119 and the second branch 225b is connected to a return line 260 whereby the control cylinder port 220 has pressure removed. The control piston 211 shifts toward the left, as viewed in FIG. 1, to shift the wobbler 30 in a clockwise direction to a minimum displacement position for a smaller torque, higher speed portion of the deploy cycle of operation. As the valve spool 110 returns to its final position, there is a reversal of connections to the line 225 where, at the end of the deploy cycle, the wobbler 30 goes back to intermediate position for higher torque at the end of the cycle.

A second embodiment of the invention is shown in FIG. 2, wherein components having the same general function as in the embodiment of FIG. 1 have been given the same reference numerals with a prime affixed thereto.

The embodiment of FIG. 2 relates to a two-position control of the wobbler 30' to have either a minimum displacement position to provide relatively low torque high speed operation and a maximum displacement position to provide a higher torque lower speed operation. In use of a power drive unit for operation of thrust reverser structure, for example, it is necessary to have a higher torque capability in a stow operation while in a deploy operation there can be a lower torque high speed operation.

There are some structural variations in the basic system shown in FIG. 2, with the sequence valve 51' having a valve spool 300 with lands 301, 302, and 303. The sequence valve 51' controls the supply of a pressure signal to line 52' for a deploy operation and, additionally, has flow therethrough from the supply line 35' to an inlet flow-regulating valve 305. This flow is through a line 306. In the position shown in FIG. 2, there is flow through the line 306 by a positioning of the valve lands 301 and 302. This valve also controls a line 310 extending from the selector and snub valve 40' to the return line 36'.

The inlet flow-regulating valve 305 and the discharge flow-regulating valve 61' are of the same construction as the discharge flow-regulating valve 61 shown in FIG. 1. Referring to the valve 305, a cup-shaped valve member 315 has a flow-restricting orifice 316 and ports 317 which coact with fixed ports 318. With increasing flow, there is an increasing pressure drop across the orifice acting on a spring 319 to cause ports 317 and 318 to control the flow rate.

Fixed valve ports 318 of the inlet flow-regulating valve 305 connect by a line 320 to a line 321 extending between line 54' and return line 36'. This line 321 has a fixed orifice 322 and a pair of check valves 323 and 324.

The linkage actuator 46' is also a valve and has a piston rod and valve member 330 movable in a cylinder and connected by a link 331 to the control member 150'. The rod has a pair of land-pistons 332 and 333 and the movement of the rod 330 is restricted by a pair of shoulders 330a and 330b formed in the bore of the cylinder. The land-piston 332 is a differential area piston and, thus, is normally urged to the left by pressure in first branch supply line 45' and is urged to the right when pressure is applied through line 54'.

The selector and snub valve 40' has a valve member 340 with a pair of spaced-apart lands 341 and 342 and an intermediate land 343 therebetween. Additionally, the valve member 340 has an internal longitudinal passage, shown in broken line at 345, with one end opening to a space 346 at an end of the valve body and the other end having a radial port 347.

The control cylinder 210' for controlling the position of the wobbler 30' has a control piston 350 connected by a link 351 with swivel ends to the wobbler 30'. The piston is urged toward the left, as viewed in FIG. 2, by a spring 352 to set the minimum displacement position for the wobbler.

The power drive unit is shown in FIG. 2, with the thrust reverser structure deployed and with a stow signal being established by the pilot solenoid valve 90' being open. This enables pressure fluid to flow through the sequence valve 51' and through the inlet flow-regulating valve 305 to the line 321 and through a branch 360 thereof to the selector and snub valve 40'. The stow signal has also been applied to branch line 45' to position the piston rod 330 to the left which positions the valve member 340 to the left. The pressure fluid delivered through line 360 then flows to the motor line 116'. Pressure fluid in branch line 45' flows through lines 361 and 362 at the linkage actuator, with the latter line extending to the control cylinder 210'. This shifts the piston 350 to the right to place the wobbler in maximum displacement position. During the stow cycle, the feedback mechanism gradually moves the valve member 340 to the right, as viewed in FIG. 2, and, at a certain point, a branch 363 of the line 362 opens into the cylinder space 346 whereby fluid can escape to one of a pair of tank lines 365 to reduce the pressure at the control cylinder 210' to set a smaller displacement for greater torque and as facilitated by a pressure drop orifice 366 in line 362. As the stow cycle concludes, the valve member land 343 moves to a position to block flow to the motor line 116'.

During the cycle, return flow from the motor can pass to a line 370 which connects with the return line 310 with direct flow to the return line 36' through the sequence valve 51'. During a stow cycle, there is a resistance load on the motor 15' at all times so that it is not necessary to control the outlet flow from the motor.

In a deploy cycle, the sequence valve 51' is also shifted to lower the valve spool 300. As a result, the sequence valve land 302 blocks the line 306 leading to the inlet flow regulating valve 305 and the land 303 blocks the return line 310. The second branch line 52' is open to the supply line which functions to actuate the latch release cylinder 53' and deliver pressure to line 54'. This shifts the linkage actuator valve 46' to the right and also delivers pressure fluid to line 360 through the check valve 323. There is resulting movement of the valve members 340 to the right to position valve land 343 whereby pressure fluid passing through check valve 323 can flow through motor line 117'. There is no pressure delivered to the control cylinder 210' because of the shift of the valve member 330 and the connection of branch line 363 to return through positioning of the valve member 340. Thus, in the deploy cycle, the wobbler is in minimum displacement position. Return flow from the motor through line 116' flows through line 365 to the return line 310. Since the sequence valve is positioned to block line 310, the return flow passes through a line 380 to the discharge flow regulating valve 61'. This valve has its outlet port 131' connected by a line 385 to the return line 36'. The line 385 has a back pressure orifice 386 therein. The check valve 324 in line 321 permits part of the output of the discharge flow-regulating valve 61' to return to line 360 if required to provide adequate flow to the motor 15'.

Near the end of the deploy cycle, the feedback mechanism including the control member 150' moves the valve land 343 progressively to a close-off position for the motor line 117' and the cycle ends with deenergization of the pilot valves 90' and 105'.

The rotatable shaft 10' is shown connected to mechanical structure at 400 which can mechanically extend the drive of the power drive unit to the mechanical thrust reverser structure.

I claim:

1. A power drive unit for imparting two-directional drive to a thrust reverser mechanism with different torque demands in different cycles of operation including low torque and high speed in a deploy cycle and high torque and low speed in a stow cycle comprising, a two-direction variable displacement hydraulic motor with a displacement-varying means, a control cylinder having a piston connected to said displacement-varying means, a first circuit connected to said motor and including a valve for controlling the direction and volume of hydraulic flow to the motor and providing the same full rate of flow to said motor at the beginning of each of said cycles, and a second circuit connected to said control cylinder and including valve means operable independently of said valve for establishing the position of the piston in the cylinder at the beginning of each cycle to control the position of said displacement-varying means and have a minimal motor displacement for starting the deploy cycle and a maximum displacement for starting the stow cycle.

2. A power drive unit as defined in claim 1 including a control member for positioning of said valve, and feedback mechanism acting on said control member and responsive to operation of said motor to move said valve to a reduced flow position.

3. A power drive unit as defined in claim 2 and including a hydraulically-operated power cylinder for positioning of said control member to establish the direction of operation of the motor.

4. A power drive unit as defined in claim 3 wherein said power cylinder includes a differential area piston, means including a first valve for applying fluid pressure at all times during operation to the lesser area of the piston, and means including a second selectively operable valve for applying fluid pressure to the larger area of the piston.

5. A power drive unit as defined in claim 1 wherein said control cylinder piston has two different positions under the control of said valve means.

6. A power drive unit as defined in claim 1 wherein said control cylinder piston has three different positions under the control of said valve means.

7. A power unit for imparting two-directional drive to a mechanism with a low torque drive demand drive in one direction and a higher torque lower speed drive in the other direction including a two-directional motor with displacement-varying means, and a control cylinder for positioning of the displacement-varying means with the latter means spring-urged to one displacement setting, the improvement comprising, means including a first valve for selectively supplying pressure fluid to said control cylinder to move said displacement-varying means to a second displacement setting, means including a second valve for controlling the volume and direction of pressure fluid flow through the motor, control means for interrelating the movement of said first and second valves including a control link pivotally connected to both said first and second valves, and feedback mechanism responsive to motor operation for control of the position of said second valve.

8. A power unit comprising, a two-directional axial piston motor, an adjustable swash plate for controlling the stroke of the motor pistons, a control cylinder for positioning of said swash plate and including means to normally urge the swash plate to a relatively small displacement setting to establish a relatively high speed-low torque operation of the motor, a fluid circuit including a first valve for selectively supplying fluid to said control cylinder to move said swash plate to a second larger displacement setting to establish a relatively high torque-low speed operation of the motor, said fluid circuit including a first flow-regulating valve and a second valve in series for controlling the supply of pressure fluid to the motor, said fluid circuit including a return line from the motor and a second flow regulating valve for regulating the flow from the motor, said second flow-regulating valve permitting a greater rate of flow than the first flow-regulating valve, and a flow connection between the downstream sides of the flow regulating valves including a check valve preventing flow toward the second regulating valve, control means for said first and second valves including a control link pivotally connected thereto, and feedback mechanism responsive to motor operation for control of the position of the second valve.

9. A power drive unit for thrust reverser structure to impart movements thereto in either of two directions for either stow or deploy operation comprising, a bi-directional axial piston motor, an adjustable wobbler for controlling the stroke of the motor pistons to control motor displacement, a first valve connected to ports of the motor for controlling the direction of fluid flow to the motor, a first cylinder with a piston having differential areas responsive to fluid pressure for setting the position of said first valve, a fluid circuit including supply and return lines with said lines extended to said first valve, a first control valve in said supply line and movable between positions to open and close the supply line, a supply line branch extended to said first cylinder to act on the lesser area of the piston therein, a second supply line branch operatively connected to said first cylinder to act on the larger area of the piston therein in a deploy cycle, a second control valve in said second supply line branch and movable between positions to open and close the second supply line branch, a control cylinder for said wobbler including a piston connected to the wobbler, said control cylinder having a port at each end thereof and with said control cylinder piston having faces at opposite ends with equal area, one of said cylinder ports being connected to said second supply line branch whereby the existence of pressure fluid therein will urge said control cylinder piston in a direction to establish a minimum motor displacement, the other of said ports being connected to said first valve, and said first valve having means to either connect said other port to pressure or return to establish either an intermediate displacement position when the second supply line branch has pressure fluid or a maximum displacement position when the second supply line branch does not have pressure fluid.

10. A power drive unit for thrust reverser structure to impart movements thereto in either of two directions for either stow or deploy operation comprising, a two-directional axial piston motor, an adjustable wobbler for controlling the stroke of the motor pistons, a first valve connected to ports of the motor for controlling the direction of fluid flow to the motor, means urging the first valve to a position to cause the motor to operate in a stow operation, a first cylinder with a piston having differential areas responsive to fluid pressure for setting the position of said first valve, a fluid circuit including supply and return lines with said lines extended to said first valve, a first control valve in said supply line and movable between positions to open and close the supply line, a supply line branch extended to said first cylinder to act on the lesser area of the piston therein, a second supply line branch operatively connected to said first cylinder to act on the larger area of the piston therein, a second control valve in said second supply line branch and movable between positions to open and close the second supply line branch, a control cylinder for said wobbler including a piston connected to the wobbler, means connected to said control cylinder to control the position of the wobbler, a flow-restricting device in the return line, and means connected to said supply line and responsive to the pressure across the motor to control the pressure in said supply line.

11. A power drive unit for imparting two-directional drive to a mechanism with different torque demands at different times in the cycle of operation comprising, a two-direction motor with a displacement-varying means, a control cylinder having a piston connected to said displacement-varying means, a first circuit connected to said motor and including a valve for controlling the direction and volume of flow to the motor, a second circuit connected to said control cylinder and including valve means for controlling the position of the piston in the cylinder to control the position of said displacement-varying means, a control member for positioning of said valve, a hydraulically-operated power cylinder including a differential area piston for positioning of said control member to establish the direction of operation of the motor, feedback mechanism acting on said control member and responsive to operation of said motor to move said valve to a reduced flow position, means including a first valve for applying fluid pressure at all times during operation to the lesser area of the piston, and means including a second selectively operable valve for applying fluid pressure to the larger area of the piston.

12. A power drive unit for thrust reverser structure to impart two-directional drive thereto with different torque demands at different times in the stow and deploy cycles of operation comprising, a bi-directional axial piston motor with a displacement-varying wobbler, a control cylinder having a piston connected to said wobbler, a first circuit connected to said motor and including a valve for controlling the direction and volume of flow to the motor, a second circuit connected to said control cylinder and including valve means for controlling the position of the piston in the cylinder to control the position of said wobbler, a control member for positioning of said valve, feedback mechanism acting on said control member and responsive to operation of said motor to move said valve to a reduced flow position, a hydraulically-operated power cylinder for positioning of said control member to establish the direction of operation of the motor, and spring means acting on said valve to urge the valve to a position to cause motor operation in a stow cycle and through said control member act on said power cylinder to reset the latter to a stow cycle position upon removal of hydraulic power therefrom.

13. A power drive unit for imparting two-directional drive to a mechanism with different torque demands at different times in the cycle of operation comprising, a two-direction motor with a displacement-varying means, a control cylinder having a piston connected to said displacement-varying means, a first circuit connected to said motor and including a valve for controlling the direction and volume of flow to the motor, a second circuit connected to said control cylinder and including valve means for controlling the position of the piston in the cylinder to control the position of said displacement-varying means, said first circuit having first valve means for limiting the rate of fluid flow to said motor and second valve means for limiting the rate of fluid flow from the motor, said second valve means permitting a larger rate of flow than said first valve means, and a flow connection from the outlet of the second valve means to the first circuit between said first valve means and said first-mentioned valve.

14. A power drive unit for imparting two-directional drive to a thrust reverser mechanism with different torque demands at different times in the cycles of operation including low torque and high speed in a deploy cycle and high torque and low speed in a stow cycle comprising, a two-direction variable displacement hydraulic motor with a displacement-varying means, a control cylinder having a piston connected to said displacement-varying means, a first circuit connected to said motor and including a valve for controlling the direction and volume of hydraulic flow to the motor and providing the same full rate of flow to said motor at the beginning of each of said cycles, a second circuit connected to said control cylinder and including valve means operable independently of said valve for establishing the position of the piston in the cylinder at the beginning of each cycle to control the position of said displacement-varying means and have an intermediate motor displacement for starting the deploy cycle and a maximum displacement for starting the stow cycle, and means operable at a predetermined position of the thrust reverser mechanism during the deploy cycle to reduce the motor displacement.

15. A power drive unit as defined in claim 14 further including means operable just prior to the end of the deploy cycle for moving said displacement-varying means back to said position for intermediate motor displacement.

* * * * *